(12) United States Patent
Chikazawa

(10) Patent No.: US 9,319,621 B2
(45) Date of Patent: Apr. 19, 2016

(54) DISPLAY APPARATUS AND TELEVISION RECEIVER

(71) Applicant: SHARP KABUSHIKI KAISHA, Osaka-shi, Osaka (JP)

(72) Inventor: Hideyuki Chikazawa, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

(21) Appl. No.: 14/405,645

(22) PCT Filed: Jun. 20, 2013

(86) PCT No.: PCT/JP2013/066903
§ 371 (c)(1),
(2) Date: Dec. 4, 2014

(87) PCT Pub. No.: WO2014/002855
PCT Pub. Date: Jan. 3, 2014

(65) Prior Publication Data
US 2015/0156446 A1     Jun. 4, 2015

(30) Foreign Application Priority Data
Jun. 25, 2012  (JP) ................................ 2012-142056

(51) Int. Cl.
| G02F 1/13357 | (2006.01) |
| F21V 8/00 | (2006.01) |
| H04N 5/655 | (2006.01) |
| H04N 5/64 | (2006.01) |
| G02F 1/133 | (2006.01) |

(Continued)

(52) U.S. Cl.
CPC ................ *H04N 5/655* (2013.01); *G02B 6/009* (2013.01); *G02B 6/0083* (2013.01); *G02F 1/13306* (2013.01); *G02F 1/133308* (2013.01); *H04N 5/44* (2013.01); *H04N 5/64* (2013.01); *H05K 5/0017* (2013.01); *G02B 6/0081* (2013.01); *G02F 2001/133314* (2013.01)

(58) Field of Classification Search
CPC .... H04N 5/655; H04N 5/64; G02F 1/133308; G02F 2001/133314; G02B 6/009; H05K 5/0017
See application file for complete search history.

(56) References Cited

U.S. PATENT DOCUMENTS

2006/0243948 A1    11/2006  Ishiwa et al.
2007/0279549 A1*   12/2007  Iwasaki ............... G02B 6/0021
                                                          349/64

(Continued)

FOREIGN PATENT DOCUMENTS

JP      2006-267936 A     10/2006
JP      2007-171459 A     7/2007

(Continued)

*Primary Examiner* — David V Bruce
(74) *Attorney, Agent, or Firm* — Birch, Stewart, Kolasch & Birch, LLP

(57) ABSTRACT

A television receiver includes a reception section receiving television broadcast, and a display apparatus on which an image is displayed based on the television broadcast received by the reception section. The backlight chassis included in the display apparatus supports a light source unit emitting light for displaying an image and constitutes a part of an outer casing of the display apparatus. The backlight chassis has an integrally continuous circumferential wall formed of side walls vertically extending from the respective sides of the bottom wall of a rectangular shape. The circumferential wall surrounds the light source unit.

7 Claims, 5 Drawing Sheets

(51) Int. Cl.
  *H04N 5/44* (2011.01)
  *H05K 5/00* (2006.01)
  *G02F 1/1333* (2006.01)

(56) References Cited

U.S. PATENT DOCUMENTS

2008/0180972 A1  7/2008  Sakamoto et al.
2011/0115838 A1  5/2011  Furusawa

FOREIGN PATENT DOCUMENTS

| JP | 2008-186780 A | 8/2008 |
| JP | 2009-31756 A | 2/2009 |
| JP | 2009-93192 A | 4/2009 |
| JP | 2009-300582 A | 12/2009 |
| JP | 2010-109803 A | 5/2010 |
| JP | 2011-191601 A | 9/2011 |
| JP | 2012-58546 A | 3/2012 |
| WO | WO 2010/001657 A1 | 1/2010 |

* cited by examiner

DISPLAY APPARATUS AND TELEVISION RECEIVER

This application is the national phase under 35 U.S.C. §371 of PCT International Application No. PCT/JP2013/066903 which has an International filing date of Jun. 20, 2013 and designated the United States of America.

FIELD

The present invention relates to a display apparatus on which an image is displayed, and a television receiver.

BACKGROUND

Currently, a television receiver has widely been used which is provided with a liquid-crystal display apparatus having a liquid-crystal panel on which an image is displayed, as a display apparatus (see Japanese Patent Application Laid-Open No. 2010-109803).

The display apparatus included in the television receiver described in Japanese Patent Application Laid-Open No. 2010-109803 has a backlight (light source unit) emitting light toward one surface of a liquid-crystal panel (display panel), the light source unit being supported on the bottom wall of a backlight chassis formed to have a box-like shape. The outer side of the backlight chassis is entirely covered with a back cover.

SUMMARY

A display apparatus in which an image is displayed on a display panel is currently required to be thinner and lighter. As a thin and light display apparatus, a display apparatus with a backlight chassis constituting a part of an outer casing of the display apparatus is possible. Such a display apparatus is thin and light, since the backlight chassis is not covered by a back cover.

The display apparatus has, however, low rigidity, since the back cover is not used to cover the backlight chassis. It is, therefore, necessary for the backlight chassis to have higher rigidity such that the display apparatus is not deformed due to possible impact presumed during the use, in order for the display apparatus to have sufficient rigidity.

Since the backlight chassis constitutes a part of the outer casing of the display apparatus here, the backlight chassis needs to have higher rigidity without deteriorating its appearance. Thus, it is not preferable to attach a metal part or to form a squeezed part at the bottom wall of the backlight chassis in order to increase the rigidity of the backlight chassis, since such addition of parts would deteriorate the appearance of the display apparatus.

The present invention has been made in view of the circumstances as described above. An object of the invention is to provide a thin and light display apparatus and television receiver, with a backlight chassis having high rigidity and the appearance thereof being preferable.

In the display apparatus according to the present invention in which a backlight chassis supporting a light source unit emitting light for displaying an image constitutes a part of an outer casing of the display apparatus, the backlight chassis has an integrally continuous circumferential wall which surrounds the light source unit.

According to the present invention, the backlight chassis supporting the light source unit emitting light for displaying an image and constituting a part of an outer casing has an integrally continuous circumferential wall, which surrounds the light source unit.

As the integrally continuous circumferential wall serves as a rib to the bottom wall of the backlight chassis, the rigidity of the backlight chassis, particularly the rigidity to a twisting force, is high. It is thus unnecessary to attach a metal part or to form a squeezed part at a portion constituting a part of the outer casing, such as the bottom wall and circumferential wall, of the backlight chassis, allowing the display apparatus to have a preferable appearance. Moreover, no member is provided for covering the entire backlight chassis, allowing the display apparatus to be thin and light.

In the display apparatus according to the present invention, the circumferential wall is provided with a cutout.

According to the present invention, the backlight chassis is provided with a cutout at a circumferential wall thereof. It is therefore possible to arrange FPC (Flexible Printed Circuit) for connecting the display panel, on which an image is displayed, to a control circuit controlling the display of an image on the display panel in the cutout, facilitating the wiring of FPC.

In the display apparatus according to the present invention, the backlight chassis further supports a display panel on which the image is displayed with superposed on the light source unit.

According to the present invention, the display panel with superposed on the light source unit is supported by the backlight chassis, so that the thickness of the display apparatus is further reduced.

A television receiver according to the present invention comprises the display apparatus described above, and a reception section receiving television broadcast. An image is displayed on the display apparatus based on the television broadcast received by the reception section.

According to the present invention, an image is displayed on the display apparatus described above based on the television broadcast received by the reception section. The backlight chassis of the display apparatus has high rigidity. It is thus unnecessary to attach a metal part or to form a squeezed part at a portion constituting a part of the outer casing, such as the bottom wall and circumferential wall, of the backlight chassis, allowing the display apparatus to have a preferable appearance. Furthermore, since no member is provided for covering the entire backlight chassis, the television receiver is thin and light.

According to the present invention, as the backlight chassis surrounds the light source unit and has an integrally continuous circumferential wall, a thin and light display apparatus and television receiver having a backlight chassis with high rigidity and a preferable appearance can be realized.

The above and further objects and features will move fully be apparent from the following detailed description with accompanying drawings.

DETAILED DESCRIPTION OF NON-LIMITING EXAMPLE EMBODIMENTS

The present invention will now be described below with reference to the drawings illustrating an embodiment thereof.

Figure 1:
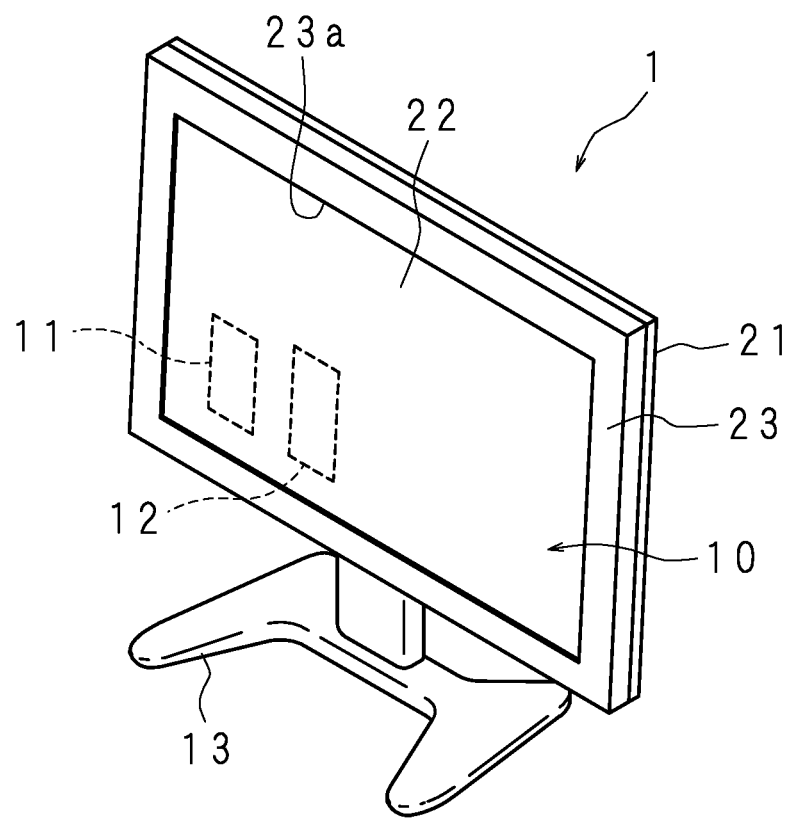
FIG. 1 is a schematic view illustrating an appearance of a television receiver according to the present invention.

FIG. 1 is a schematic view illustrating an appearance of a television receiver according to the present invention. The television receiver 1 includes a display apparatus 10, a reception section 11, a signal processing section 12 and a stand 13.

The display apparatus 10 includes a display panel 22 of a rectangular plate-like shape on which an image is displayed. The circumferential part of the display panel 22 is covered by a cover 23 of a rectangular frame-like shape having an opening 23*a* at a middle part of the cover 23. In the display panel 22, an effective display area located at the middle part of the display surface on which an image is displayed is exposed through the opening 23*a*.

Here, the vertical and horizontal dimensions of the opening 23*a* is somewhat smaller than the vertical and horizontal dimensions of the display panel 22 in order for the cover 23 to cover the periphery of the display panel 22.

Moreover, a surface opposite to the display surface of the display panel 22 is covered by a backlight chassis 21. The backlight chassis 21 supports a light source unit, which will be described later, emitting light to the opposite surface, and constitutes a part of the outer casing of the display apparatus 10.

The reception section 11 is connected to an antenna (not illustrated) and receives television broadcast through the antenna. The signal processing section 12 demodulates data concerning television broadcast received by the reception section 11, separates image data from the demodulated data, and outputs the separated image data. In the display panel 22, an image based on the image data output by the signal processing section 12 is displayed on the display surface exposed through the opening 23*a* of the cover 23.

The stand 13 is provided at the outer side of the backlight chassis 21 to support the display apparatus 10 in the vertical position.

In the description below, the side on which the display panel 22 is located corresponds the front side, while the opposite side thereto corresponds the rear side in the display apparatus 10. Furthermore, in the television receiver 1, the side on which the stand 13 is located corresponds to the lower side of the display apparatus 10, and the opposite side thereto corresponds to the upper side of the display apparatus 10. In the display apparatus 10 installed using the stand 13, the right side and left side of the display panel 22 exposed through the opening 23*a* of the cover 23 when viewed from the outside is regarded as the right side and left side, respectively, of the display apparatus 10.

Figure 2:
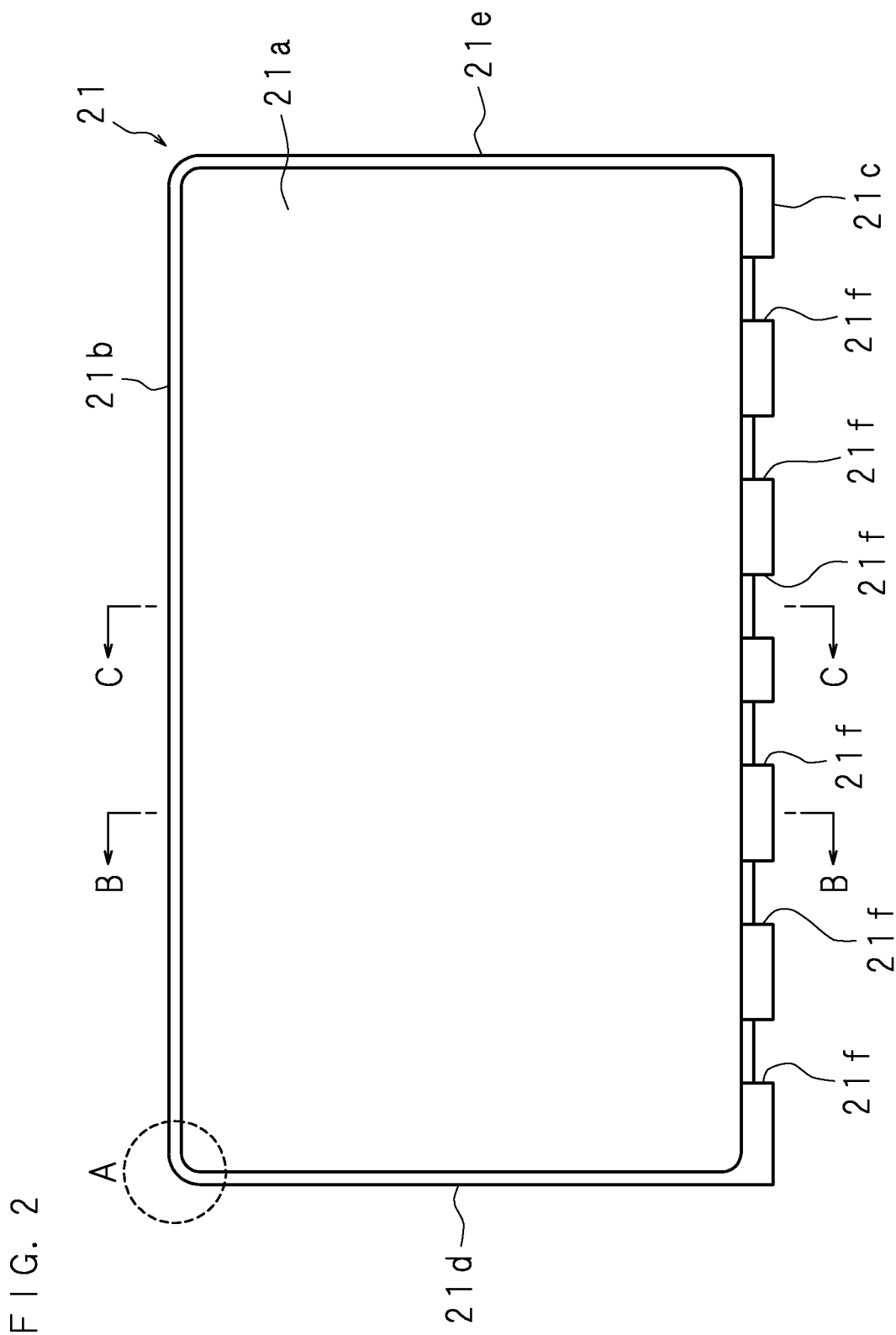
FIG. 2 is a front view of a backlight chassis.

FIG. 2 is a front view of the backlight chassis 21. The backlight chassis 21 has a box-like shape with one surface opened, and has side walls 21*b*, 21*c*, 21*d* and 21*e* vertically extending from the respective sides of a bottom wall 21*a* having a rectangular plate-like shape. The side walls 21*b*, 21*c*, 21*d* and 21*e* have substantially the same height and substantially the same thickness. In the display apparatus 10, the backlight chassis 21 is so arranged that the side walls 21*b*, 21*c*, 21*d* and 21*e* correspond to the upper, lower, left and right sides, respectively, of the display apparatus 10.

The backlight chassis 21 is fabricated by, for example, pressing an aluminum plate. The side walls 21*b*, 21*c*, 21*d* and 21*e* form an integrally continuous circumferential wall. The portion A illustrated in FIG. 2 indicates a connecting part of the side walls 21*b* and 21*d*.

Figure 3:
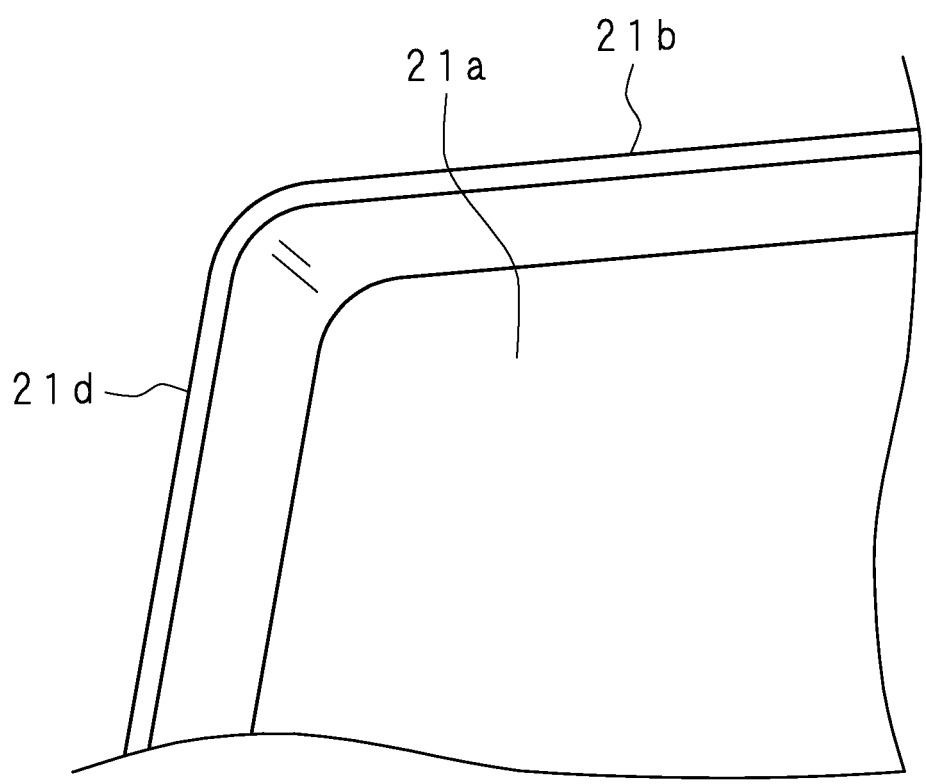
FIG. 3 is a perspective view of an enlarged portion A of the backlight chassis in FIG. 2.

FIG. 3 is a perspective view of an enlarged portion A of the backlight chassis 21 in FIG. 2. As illustrated in FIG. 3, the side walls 21*b* and 21*d* are continuously formed, and the connecting part of the side walls 21*b* and 21*d* curves to have a circular arc-like shape. The connecting part of the side walls 21*b* and 21*e*, the connecting part of the side walls 21*c* and 21*e*, and the connecting part of the side walls 21*c* and 21*d* also curves to have a circular arc-like shape as in the connecting part of the side walls 21*b* and 21*d*.

Furthermore, the side wall 21*c* is, as illustrated in FIG. 2, provided with rectangular cutouts 21*f*, 21*f*, . . . , 21*f* at appropriate intervals, the cutouts 21*f*, 21*f*, . . . , 21*f* being formed by cutting out the edge of the side wall 21*c* by appropriate length. At the cutouts 21*f*, 21*f*, . . . , 21*f*, FPCs 29, 29, . . . , 29 (see FIG. 4 or 5), which will be described later, are located, FPCs 29, 29, . . . , 29 being provided at similar intervals on the lower side of the display panel 22.

It is noted that the thickness of each of the bottom wall 21*a* and side walls 21*b*, 21*c*, 21*d* and 21*e* is appropriately set within the range of, for example, 1 to 1.2 mm. The depth from the opened one surface of the backlight chassis 21 to the bottom wall 21*a* is appropriately set within the range of, for example, 5 to 6 mm.

The backlight chassis 21 configured as described above has the integrally continuous circumferential wall formed of the side walls 21*b*, 21*c*, 21*d* and 21*e*. The circumferential wall serves as a rib to the bottom wall 21*a*, which increases the rigidity, particularly the rigidity to twisting force, of the backlight chassis 21. It is thus unnecessary to attach a metal part or form a squeezed part at a portion constituting a part of the outer casing of the display apparatus 10 in the backlight chassis 21, i.e. the rear surface of the bottom wall 21*a* and the outer surface of each of the side walls 21*b*, 21*c*, 21*d* and 21*e*, in order to increase the rigidity of the backlight chassis 21. The backlight chassis 21 allows the display apparatus 10 to have a preferable appearance.

Furthermore, since no member is provided for covering the entire backlight chassis 21, as illustrated in FIG. 1, the display apparatus 10 and the television receiver 1 including the display apparatus 10 are thin and light, which can respond to the demand for narrower cover 23 covering the circumferential part of the display panel 22 from the outside of the backlight chassis 21.

The backlight chassis 21 may easily be fabricated when it is made by pressing an aluminum plate. Moreover, since each of the connecting part of the side walls 21*b* and 21*e*, the connecting part of the side walls 21*c* and 21*e*, the connecting part of the side walls 21*c* and 21*d*, and the connecting part of the side walls 21*b* and 21*d* curves to have a circular arc-like shape, the backlight chassis 21 is more easily be fabricated.

Figure 4:
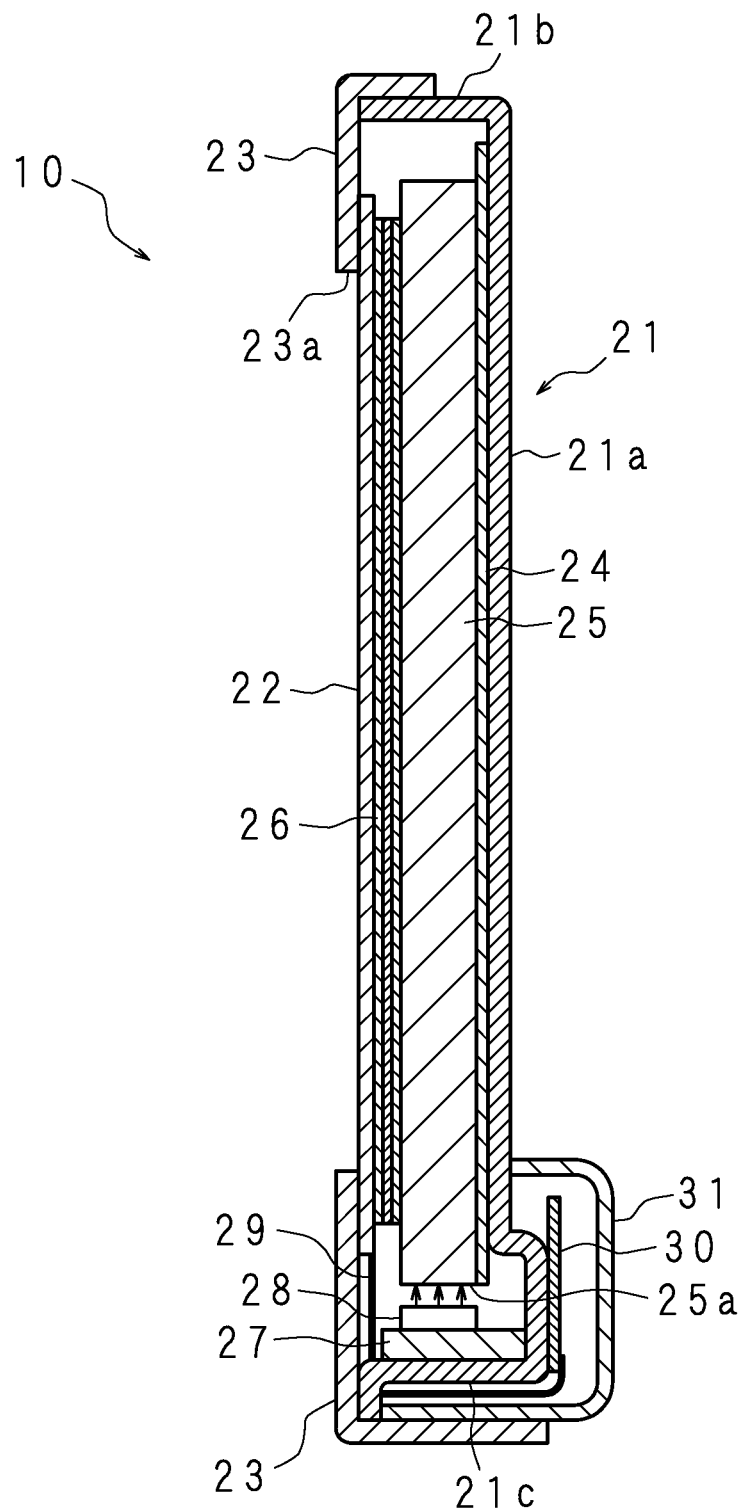
FIG. 4 is a schematic cross-section view of a display apparatus cut along the line B-B in FIG. 2.
Figure 5:
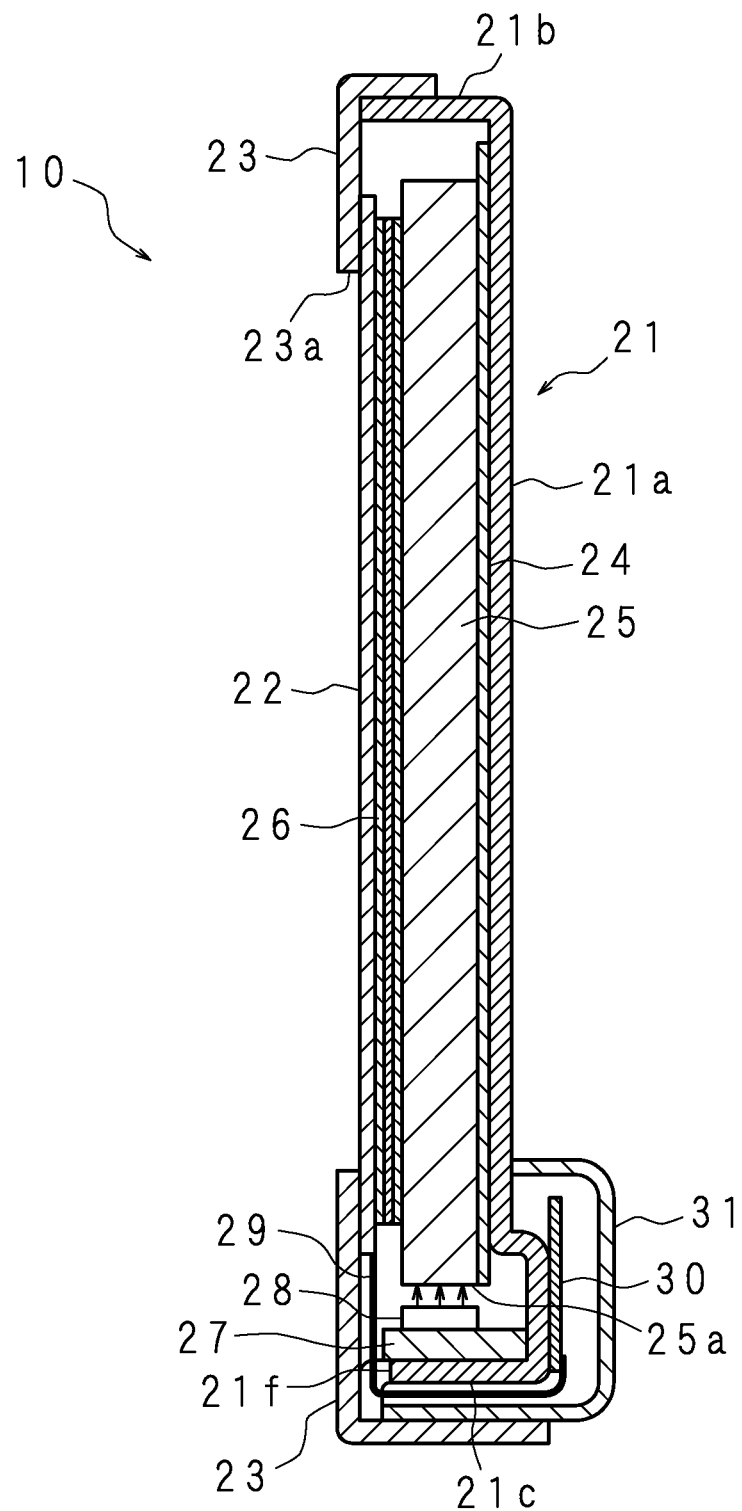
FIG. 5 is a schematic cross-section view of a display apparatus cut along the line C-C in FIG. 2.

FIG. 4 is a schematic cross-section view of the display apparatus 10 cut along the line B-B in FIG. 2, and FIG. 5 is a schematic cross-section view of the display apparatus 10 cut along the line C-C in FIG. 2. In the backlight chassis 21, a rectangular reflection sheet 24 arranged in close contact with the bottom wall 21*a*, a rectangular plate-like light guide plate 25, an optical sheet group 26 including optical sheets having similar rectangular shapes, and a display panel 22 are laminated in order from the rear side to the front side. As such, the back light chassis 21 supports the display panel 22, reflection sheet 24, light guide plate 25 and optical sheet group 26 that are superposed onto one another. The circumferential part of the display surface of the display panel 22 and the circumferential surface of the display panel 22 are covered from the outside of the backlight chassis 21 with the cover 23.

At the lower side of the lower end surface 25a of the light guide plate 25, a rectangular plate-like LED (Light Emitting Diode) substrate 27 is so arranged to have its longitudinal direction corresponding to the horizontal direction of the display apparatus 10. On the upper surface of the LED substrate 27, LEDs 28, 28, . . . , 28 (only one is illustrated in each of FIG. 4 and FIG. 5) are arranged along the longitudinal direction of the LED substrate 27 at appropriate intervals. Each of the LEDs 28, 28, . . . , 28 emits light toward the lower end surface 25a of the light guide plate 25 in the direction indicated by the arrows in FIG. 4 and FIG. 5.

The circumferential wall formed of the side walls 21b, 21c, 21d and 21e surrounds the display panel 22, reflection sheet 24, light guide plate 25, optical sheet group 26, LED substrate 27 and LEDs 28, 28, . . . , 28.

The light guide plate 25 is made with, for example, acrylic resin. The light emitted by each of the LEDs 28, 28, . . . , 28 enters from the lower end surface 25a into the light guide plate 25, and is repeatedly reflected at the front surface and rear surface of the light guide plate 25. When the light propagating through the light guide plate 25 is reflected at the front surface of the light guide plate 25, a part of the light emits toward the optical sheet group 26. Since the rear surface of the light guide plate 25 is in close contact with the reflection sheet 24, all the light propagating through the light guide plate 25 is reflected at the rear surface. This allows the light guide plate 25 to emit uniform light from the front surface of the light guide plate 25 toward the optical sheet group 26.

The vertical and horizontal dimensions of the reflection sheet 24 is larger than the vertical and horizontal dimensions of the rear surface of the light guide plate 25 while the reflection sheet 24 completely covers the rear surface of the light guide plate 25, thereby avoiding the leakage of light from the rear surface of the light guide plate 25.

The light emitted from the front surface of the light guide plate 25 passes through the optical sheet group 26 and is directed to the rear surface of the display panel 22. The optical sheet group 26 is so arranged as to be in close contact with each of the rear surface of the display panel 22 and the front surface of the light guide plate 25. The optical sheet group 26 is comprised of multiple laminated optical sheets including, for example, an optical sheet having a diffusion function of diffusing light and an optical sheet having a condensing function of condensing light. The optical sheet group 26, for example, condenses and diffuses light transmitted through the optical sheet group 26.

The display panel 22 has a glass plate on the display surface side and a glass plate on the rear surface side. Liquid crystal is disposed between the two glass plates, and the transmittance of light passing through the display panel 22 varies in accordance with the voltage applied to the liquid crystal. Accordingly, the display panel 22 transmits or blocks the light entering from the rear surface. As a result, an image is displayed on the display surface of the display panel 22.

The reflection sheet 24, light guide plate 25, LED substrate 27 and LEDs 28, 28, . . . , 28 function as a light source unit emitting light for displaying an image. Furthermore, the display panel 22 is superposed on the light guide plate 25 via the optical sheet group 26, allowing the display apparatus 10 to be thinner.

On the lower side of the display panel 22, the rectangular sheet-like FPCs 29, 29, . . . , 29 (only one is illustrated in each of FIG. 4 and FIG. 5) are provided at intervals similar to those of the cutouts 21f, 21f, . . . , 21f. One end of each of the FPCs 29, 29, . . . , 29 is connected to the display panel 22. Each of the FPCs 29, 29, . . . , 29 hangs down from the lower side of the display panel 22 and is bent backward in the state of passing through each of the cutouts 21f, 21f, . . . , 21f. The other end of each of the FPCs 29, 29, . . . , 29 is connected to the control circuit 30 located at the lower side of the back surface of the backlight chassis 21.

Such arrangement of the cutouts 21f, 21f, . . . , 21f at the side wall 21c facilitates wiring of the FPCs 29, 29, . . . , 29 connecting the display panel 22 and the control circuit 30.

Furthermore, a driving circuit (not illustrated) for applying a voltage to liquid crystal to drive the display panel 22 is mounted on each of the FPCs 29, 29, . . . , 29. Each driving circuit applies a voltage to the liquid crystal in the display panel 22 in accordance with the instructions from the control circuit 30.

The control circuit 30 indicates the voltage to be applied by each driving circuit to liquid crystal, based on the image data output by the signal processing section 12. Accordingly, the transmittance of the light passing through the display panel 22 varies based on the image data output by the signal processing section 12, and an image based on the image data is displayed on the display surface of the display panel 22.

A part of each of the FPCs 29, 29, . . . , 29 located at the lower side of the backlight chassis 21 as well as the control circuit 30 are covered with a circuit cover 31 having a box-like shape with one surface opened.

It is noted that the control circuit 30 does not have to be located at the lower part on the outside of the backlight chassis 21, but may be located in a space provided in the stand 13. In such a case, the need for the circuit cover 31 covering the control circuit 30 is eliminated, which allows the display apparatus 10 to be even thinner at the portion where the circuit cover 31 is provided and to thus be even lighter.

Moreover, the light source unit emitting light for displaying an image is not limited to the light source unit of an edge light type as described in the present embodiment. The light source unit may also be a direct-type light source unit in which LEDs 28, 28, . . . , 28 arranged on the bottom wall 21a directly emit light to the optical sheet group 26.

Furthermore, a cold-cathode tube, e.g., fluorescent tube, may be used in place of the LEDs 28, 28, . . . , 28.

The shape of the cutout 21f is not limited to rectangular but may be any shape through which the FPC 29 passes. Moreover, a member passing through the cutout 21f is not limited to the FPC 29.

Furthermore, the shape of the bottom wall 21a of the backlight chassis 21 is not limited to a rectangular plate-like shape but may also be a triangular plate-like shape, a polygonal plate-like shape with five or more sides, or may be a circular plate-like shape or an oval plate-like shape.

Moreover, the image displayed on the display apparatus 10 is not limited to the image based on television broadcast. An image concerning the image data obtained from a communication network, for example, the Internet may also be displayed on the display apparatus 10.

The invention claimed is:

1. A display apparatus in which a backlight chassis supporting a light source unit emitting light for displaying an image constitutes a part of an outer casing of the display apparatus,
   wherein the backlight chassis has:
   an integrally continuous circumferential wall which surrounds the light source unit; and
   a bottom wall provided continuously at one side of the circumferential wall,
   wherein a recessed part recessed to a side opposite to the light source unit is formed on the bottom wall, and wherein the light source unit has:

a light source arranged at the recessed part; and a light guide plate with one end surface which light from the light source enters and one surface from which light emits.

2. The display apparatus according to claim 1, wherein the circumferential wall is continuously formed to have a rectangular shape, and wherein each corner of the circumferential wall curves to have a circular arc-like shape.

3. The display apparatus according to claim 1, wherein the backlight chassis has a box-like shape with one surface opened and is made by pressing a metal plate.

4. The display apparatus according to claim 1, further comprising:

a control circuit arranged on an outer surface of the bottom wall and controlling display of an image.

5. The display apparatus according to claim 1, wherein the circumferential wall is provided with a cutout.

6. The display apparatus according to claim 1, wherein the backlight chassis further supports a display panel on which the image is displayed with superposed on the light source unit.

7. A television receiver, comprising:

the display apparatus according to claim 1; and a reception section receiving television broadcast, wherein an image is displayed on the display apparatus based on the television broadcast received by the reception section.

* * * * *